(12) United States Patent
Kim et al.

(10) Patent No.: US 12,026,894 B2
(45) Date of Patent: Jul. 2, 2024

(54) SYSTEM FOR PREDICTING NEAR FUTURE LOCATION OF OBJECT

(71) Applicant: AIMATICS CO., LTD., Seoul (KR)

(72) Inventors: Jin Hyuck Kim, Seoul (KR); Jin Wook Lim, Yongin-si (KR)

(73) Assignee: AIMATICS CO., LTD., Seoul (KR)

( * ) Notice: Subject to any disclaimer, the term of this patent is extended or adjusted under 35 U.S.C. 154(b) by 394 days.

(21) Appl. No.: 17/635,665

(22) PCT Filed: Dec. 28, 2021

(86) PCT No.: PCT/KR2021/020095
§ 371 (c)(1),
(2) Date: Feb. 15, 2022

(87) PCT Pub. No.: WO2022/146000
PCT Pub. Date: Jul. 7, 2022

(65) Prior Publication Data
US 2023/0222671 A1    Jul. 13, 2023

(30) Foreign Application Priority Data
Dec. 29, 2020    (KR) .................. 10-2020-0185615

(51) Int. Cl.
G06T 7/20    (2017.01)
G06T 3/40    (2006.01)
G06V 10/22    (2022.01)
G06V 20/58    (2022.01)
H04W 4/029    (2018.01)

(52) U.S. Cl.
CPC .................. G06T 7/20 (2013.01); G06T 3/40 (2013.01); G06V 10/22 (2022.01); G06V 20/58 (2022.01); H04W 4/029 (2018.02); G06T 2207/20084 (2013.01); G06T 2207/30241 (2013.01); G06T 2207/30252 (2013.01)

(58) Field of Classification Search
CPC ........... G06V 20/58; G06V 10/22; G06T 3/40
See application file for complete search history.

(56) References Cited

U.S. PATENT DOCUMENTS

2020/0356812 A1 * 11/2020 Oleynik ............... H04N 13/246

FOREIGN PATENT DOCUMENTS

| KR | 101979375 B1 | 8/2019 |
| KR | 1020200039547 A | 4/2020 |
| KR | 102143031 B1 | 8/2020 |
| KR | 102143034 B1 | 8/2020 |

* cited by examiner

Primary Examiner — Sam Bhattacharya
(74) Attorney, Agent, or Firm — You & IP, LLC

(57) ABSTRACT

The present disclosure relates to a system for predicting a near future location of an object, which predicts a near future location of a dynamic object, through learning for sampling a sample obtained by estimating a location of the dynamic object by learning an image at current timing, which is captured by a camera, based on artificial intelligence and for changing the sample of the dynamic object whose location has been estimated into a Gaussian mixture model (GMM) by using history data.

26 Claims, 10 Drawing Sheets

(a)     (b)

(a)     (b)

(a)     (b)

(a)          (b)

(a)          (b)

SYSTEM FOR PREDICTING NEAR FUTURE LOCATION OF OBJECT

TECHNICAL FIELD

The present disclosure relates to a system for predicting a near future location of an object, which predicts a near future location of a dynamic object, through learning for sampling a sample obtained by estimating a location of the dynamic object by learning an image at current timing, which is captured by a camera, based on artificial intelligence and for changing the sample of the dynamic object whose location has been estimated into a Gaussian mixture model (GMM) by using history data.

BACKGROUND ART

In general, an image recognition technology is used to recognize a location of an object from an image captured by a camera and determine the type of recognized object, and is used in various industry fields such as an autonomous vehicle, a surveillance camera system, and robot control. For example, in the autonomous vehicle, a static object (such as a lane, a traffic light, a sign, a building, a sidewalk, or an obstacle) may be recognized, and a driving posture of the vehicle may be controlled based on the results of the recognition. If the autonomous vehicle recognizes a dynamic object (such as a surrounding vehicle, a pedestrian, a bicycle, or a two-wheeled vehicle), the autonomous vehicle may perform posture control for predicting or warning a collision against the dynamic object or avoiding the collision. As another example in which an autonomous vehicle recognizes an object and copes with the object, an object recognition system may be used in robot control, a surveillance camera system, etc.

Conventionally, techniques for recognizing a location of an object in an image and predicting a future location of a moving object have been basically developed based on a dynamic approach. Referring to FIG. 1, when a location of a moving object 10 recognized in an image changes from a past point d1 to a current point d2, a speed may be obtained based on time information and location information at d1 and d2. Furthermore, the location information at d3, that is, a future location of the moving object 10, is predicted on the premise that the moving object 10 will move in the same moving direction and at the same speed. That is, a conventional dynamic approach method may suggest only one prediction location.

However, as in FIG. 2, locations of objects may be variously changed depending on their current geopolitical locations or their relations with other objects. A conventional dynamic approach method has limitations in predicting a future location of an object because such a change cannot be taken into consideration. Referring to FIG. 2, it is assumed that a moving object is a pedestrian 20 and located at the end point of a crosswalk. A moving direction of the pedestrian 20 from the past to the present may be indicated as an arrow 1. The pedestrian 20 may move in the same moving direction and at the same speed (an arrow 2), may change his or her moving direction along the crosswalk (an arrow 3), may slightly turn to the right and continue to walk along a sidewalk (an arrow 4), may greatly change his or her direction in order to get in a vehicle coming to pick him or her up (an arrow 5), or may suddenly walk diagonally across a road and jaywalk (an arrow 6). The pedestrian 20 is hardly likely to attempt to jaywalk in the direction of the arrow 6, but this is one of traffic accidents that actually occur, which must be taken into consideration.

When consideration is taken with reference to FIG. 2, it may be seen that it is not preferred to predict only one location by using the past information when a near future location of an object is predicted. Furthermore, in relation to a movement of a moving object, it is necessary to consider a relation between the types and characteristics of the moving object and a static object in the background of an image, and an interaction between the moving object and another dynamic object. Moreover, moving objects are chiefly living things having intelligence or devices manipulated by living things, and may different behavior patterns in the same external environment. Accordingly, the behavior patterns of the moving things or the devices cannot be accurately predicted by only monitoring the external environment. That is, there is a need to provide an improved system for predicting a near future location of an object.

Meanwhile, a conventional object recognition system predicts a future location for only a moving object recognized at current timing in predicting a movement of the moving object. For example, Korean Patent No. 10-1979375 entitled "METHOD OF PREDICTING OBJECT BEHAVIOR OF SURVEILLANCE VIDEO", Korean Patent No. 10-2143034 entitled "METHOD AND SYSTEM FOR TRACKING OBJECT IN VIDEO THROUGH PREDICTION OF FUTURE MOTION OF OBJECT", Korean Patent No. 10-2143031 entitled "METHOD AND SYSTEM FOR PREDICTING FUTURE MOTION OF OBJECT IN STILL IMAGE", Korean Patent Application Publication No. 10-2020-0039547 entitled "METHOD FOR TRACKING OBJECT BY USING CONVOLUTIONAL NEURAL NETWORK INCLUDING TRACKING NETWORK AND COMPUTING DEVICE USING THE SAME", etc. predict a near future location of an object by artificially learning a movement pattern of the object or tracking the movement pattern of the object through an artificial learning method after recognizing the object. All the conventional object recognition systems can merely predict a future location, a moving pattern, etc. of an object recognized at current timing.

However, in an actual driving environment, a pedestrian who is covered by a parked vehicle or the corner of a building at a curved portion of a sidewalk may suddenly appear. That is, an improved system for predicting a near future location of an object also needs to predict objects that are not present in a current image.

DISCLOSURE

Technical Problem

An object of the present disclosure is to provide a system for recognizing a dynamic object in a current timing image by learning an image, captured by a camera, based on artificial intelligence, and predicting a near future location of the dynamic object The system can predict a near future location of a dynamic object, which does not appear in a current timing image, as well as a near future location of a dynamic object, which has already appeared in the current timing image, and can also predict a sudden change in the location of a dynamic object in a current timing image, by estimating the location of the dynamic object and generating a sample through artificial intelligence learning within context provided by a static background other than the dynamic object, and predicting a near future object bounding box through the learning of a residual between a near future object bounding box and an object estimation bounding box estimated in the sample based on the results of the recognition of the dynamic object.

Furthermore, an object of the present disclosure is to provide a system for predicting a near future location of an object, which can predict a sudden change in the location of a dynamic object and promote the safety driving of a vehicle driver by visualizing N near future object bounding box samples as the final future object bounding box (a bounding box indicative of a near future location of a dynamic object monitored at current timing) and the final future object bounding hypothesis box (a bounding box indicative of a near future location of a dynamic object not monitored at the current timing) in a way to change the N near future object bounding box samples into K Gaussian mixture models (GMMs) by using an image history, an input signal history, etc. from given past timing to current timing.

Technical Solution

A system for predicting a near future location of an object according to an embodiment of the present disclosure includes: a segmentation neural network configured to recognize objects in a current timing image photographed by the current timing image as a vehicle and output segmentation image obtained by assigning attributes to the respective recognized objects; an object post-processing module configured to convert the segmentation image into a static segmentation image by finding a dynamic object in the segmentation image and removing the dynamic object; an object bounding box sample estimation neural network configured to receive the static segmentation image, estimate a location of the dynamic object within the static segmentation image, generate an object estimation bounding box at each point at which the dynamic object is estimated to be located, generate an object bounding box sample including at least one object estimation bounding box, and output the object bounding box sample; and an object bounding residual estimation neural network configured to receive the current timing image and the static segmentation image, receive, from the vehicle, a sensing signal in a time identical with a time of the current timing image as an input signal, predict a bounding box in which the dynamic object recognized in the current timing image is predicted to be located in a near future, operate an object bounding residual which is a difference between the predicted bounding box and the object estimation bounding box, and output a near future object bounding box sample including at least one near future object bounding box indicative of a near future location of the dynamic object by adding the object bounding residual to the object bounding box sample.

Advantageous Effects

According to the system for predicting a near future location of an object according to the present disclosure, there are effects in that it is possible to predict a near future location of a dynamic object recognized in a current timing image, a near future location of a dynamic object not appearing in the current timing image, and a sudden change in the location of a dynamic object and to significantly increase the avoidability of a collision against a dynamic object in an autonomous vehicle in a current timing image, by estimating the location of the dynamic object and generating a sample through artificial intelligence learning within context provided by a static background other than the dynamic object, and predicting a near future object bounding box through the learning of a residual between a near future object bounding box and an object estimation bounding box estimated in the sample, based on the results of the recognition of the dynamic object, without dynamically tracking a dynamic object after the dynamic object is recognized.

Furthermore, according to the present disclosure, there are effects in that it is possible to predict a sudden change in the location of a dynamic object and to promote the safety driving of a vehicle driver by visualizing N near future object bounding box samples as the final future object bounding box (a bounding box indicative of a near future location of a dynamic object monitored at current timing) and the final future object bounding hypothesis box (a bounding box indicative of a near future location of a dynamic object not monitored at the current timing) in a way to change the N near future object bounding box samples into K Gaussian mixture models (GMMs) by using an image history, an input signal history, etc. from given past timing to current timing.

BEST MODE

Figure 1:
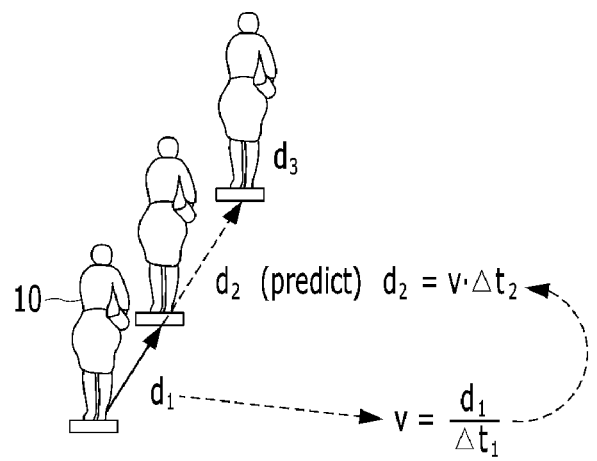
FIG. 1 is a diagram illustrating a conventional method of dynamically predicting a location of a moving object.
Figure 2:
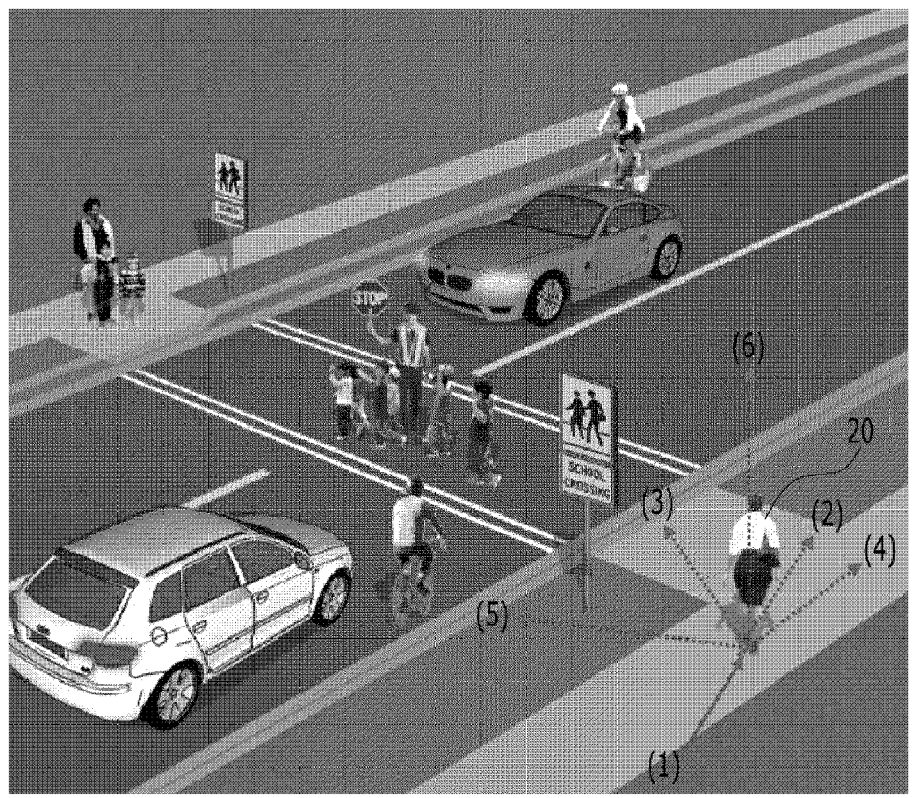
FIG. 2 is a diagram illustrating an example in which a location of a moving object around a crosswalk is predicted.

Hereinafter, detailed embodiments according to the present disclosure are described with reference to the accompanying drawings. It is however to be understood that the present disclosure is not intended to be limited to the specific embodiments and includes all changes, equivalents and substitutions which fall within the spirit and technical scope of the present disclosure.

The same reference numeral is assigned to a portion having a similar element and operation throughout the specification. Furthermore, the accompanying drawings of the present disclosure are for convenience of description, and shapes and relative criteria thereof may be exaggerated or omitted.

In specifically describing the embodiments, a redundant description or a description of a technique evident in a corresponding field has been omitted. Furthermore, in the following description, when it is said that one element "includes" the other element, the word "include" means that the one element may further include an element other than the describe element unless explicitly described to the contrary.

Furthermore, a term, such as " . . . unit", " . . . er (or . . . or)", or " . . . module" described in the specification, means a unit for processing at least one function or operation, and this may be implemented by hardware or software or a combination thereof. Furthermore, when it is described that one part is electrically connected to another part, it should be understood that the two parts may be directly connected to each other, or may be connected to each other with a third part interposed therebetween.

Terms, such as a "first" and a "second", may be used to describe various elements, but the elements are not limited by the terms. The terms are used to only distinguish one element from the other element. For example, a first element may be named a second element without departing from the scope of a right of the present disclosure. Likewise, a second element may be named a first element.

A system for predicting a near future location of an object according to the present disclosure uses, as core data, an image captured by a camera, and predicts a near future location of a dynamic object included in a current timing image. In this case, the dynamic object means a moving object, such as a surrounding vehicle, a pedestrian, a bicycle, or a two-wheeled vehicle. Among terms used in the present disclosure, a static object means an object that does not move contrary to a dynamic object, and is an object such as a lane, a traffic light, a sign, a building, a sidewalk, or an obstacle.

Figure 3:
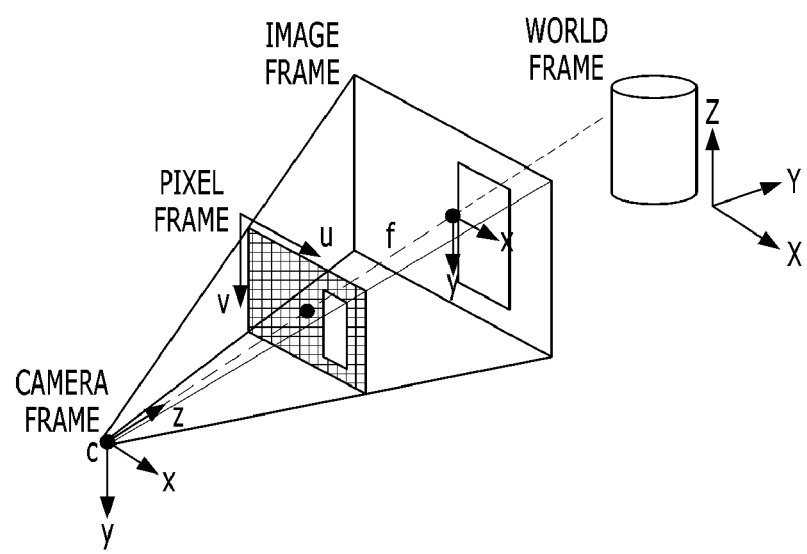
FIG. 3 is a diagram illustrating a process of converting, into image data, an image captured by a camera.

Prior to a detailed description of the system for predicting a near future location of an object according to the present disclosure, a process of converting, into image data, an image captured by a camera is first described with reference to FIG. 3.

The camera is a conversion device for projecting a three-dimensional (3-D) real world onto a two-dimensional (2-D) plane through a lens. Images received by a reception unit within the camera are converted into a digital signal through an image sensor. The digital signal is 2-D plane data indicating resolution of a unit pixel and a horizontal and vertical size of an image. RGB data of each pixel is data that represents color information of real-world objects. A still image, that is, 2-D plane data included in one image frame, is described as an "image" in the following description. If timing at which an image is photographed is the present, the image is described as a current timing image. Meanwhile, images that are repeatedly photographed and stored at time intervals are represented as an image sequence, and are described as an "image history" in the following description.

The system for predicting a near future location of an object according to the present disclosure generates a background image consisting of only a static object without a dynamic object by pre-processing an image by using a neural network scheme for assigning semantic attributes to each of pixels within the image. Furthermore, proposed is a method of predicting a near future location of a dynamic object, which has appeared in an image (has already appeared in a current timing image) or is expected to appear in an image (has not appeared in the current timing image) through post-processing neural network learning using a current timing image as an input and a near future image as a ground true.

In this case, when a vehicle on which the camera has been mounted travels on a road, the location and angle of the camera are gradually changed. Since a movement of the camera causes a change in an image captured by the camera, a movement of the camera needs to be corrected upon image learning. In the present disclosure, in order to correct such a movement of the camera, a vehicle sensing signal is used as an input signal. For example, a driving speed, rotation angle, and yaw rate of the vehicle may be obtained through car area network (CAN) communication within the vehicle or an on-board diagnostics (OBD) terminal. Furthermore, for example, three-axis acceleration (X, Y, Z), three-axis rotating angular speed (yaw, pitch, roll), a three-axis terrestrial magnetism, etc. may be obtained from a navigation terminal for a vehicle or an inertial sensor (IMU). Furthermore, for example, longitude, latitude, moving directions, speeds, etc. monitored by satellites may be obtained from a GPS module. Moreover, information, such as a location and a moving speed estimated through vehicle to vehicle (V2V), vehicle to infra (V2), Wi-Fi, LTE, or a 5G communication network and a location and a moving speed obtained by measuring a relative distance to a fixed facility through a distance sensor mounted on a vehicle, such as a Lidar or a Radar, may also be obtained. Locations of objects within an image may be corrected by using any one of the listed input signals or complexly using these signals.

Figure 4:
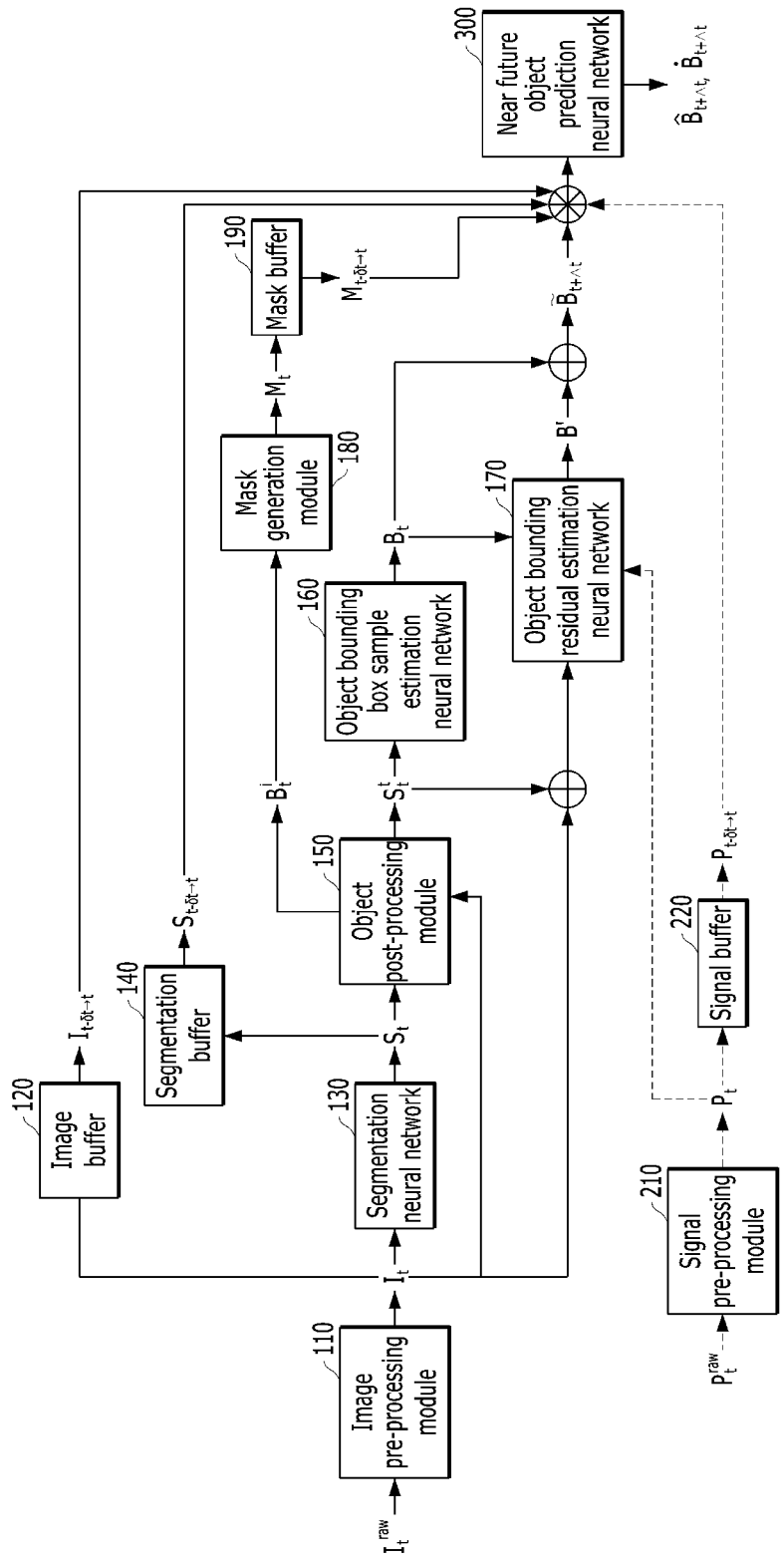
FIG. 4 is a block diagram illustrating a system for predicting a near future location of an object according to the present disclosure.
Figure 5:
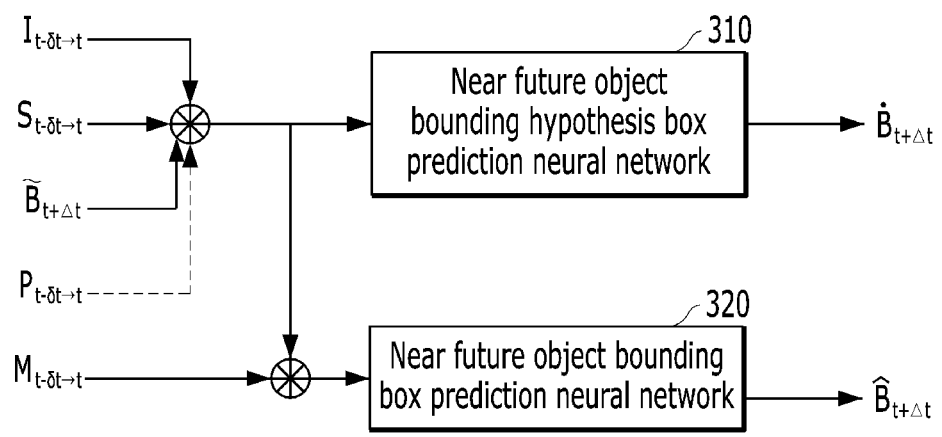
FIG. 5 is a block diagram illustrating a structure of a near future object prediction neural network in FIG. 4.

FIG. 4 is a block diagram illustrating a system for predicting a near future location of an object according to the present disclosure. FIG. 5 is a block diagram illustrating a structure of a near future object prediction neural network in FIG. 4.

Referring to FIG. 4, the system for predicting a near future location of an object according to the present disclosure includes an image pre-processing module 110, an image buffer 120, a segmentation neural network 130, segmentation buffer 140, an object post-processing module 150, an object bounding box sample estimation neural network 160, an object bounding residual estimation neural network 170, a mask generation module 180, a mask buffer 190, a signal pre-processing module 210, a signal buffer 220, and a near future object prediction neural network 300. Referring to FIG. 5, the near future object prediction neural network 300 includes a near future object bounding hypothesis box prediction neural network 310 and a near future object bounding box prediction neural network 320.

The image pre-processing module 110 receives an image ($I_t^{raw}$) having a raw level at current timing (t), which is captured by a camera. The image ($I_t^{raw}$) having a raw level at the current timing may be directly received from the camera or may be received via another device within a vehicle. Furthermore, if the system for predicting a near future location of an object according to the present disclosure is constructed in a cloud server, the image ($I_t^{raw}$) having a raw level at the current timing may be remotely received from a vehicle.

The image pre-processing module 110 generates a current timing image ($I_t$) by pre-processing the image ($I_t^{raw}$) having a raw level. The image pre-processing module 110 generates the current ($I_t$) by performing normalization using at least any one of an image resize and an image crop on the image ($I_t^{raw}$) having a raw level.

The image buffer 120 is means for transmitting image data in a frame unit at high speed, and is means for transmitting, to the near future object prediction neural network 300, an image history ($I_{t-\delta t \to t}$) from current timing (t) to given past timing (t−δt).

The signal pre-processing module 210 is means for collecting sensing signals from a plurality of sensors installed in a vehicle, and normalizing the sensing signals. The signal pre-processing module 210 receives an on-board diagnostics (OBD) signal, an inertial measurement unit (IMU) signal, and global positioning system (GPS) signals, that is, signals ($P_t^{raw}$) each having a raw level at the current timing (t), from the vehicle sensors, and normalizes a combination of the signals as an ego-motion signal related to a movement of an ego vehicle. In the present disclosure, the normalized signal is provided as an input signal ($P_t$) at current timing of the object bounding residual estimation neural network 170. For example, the input signal ($P_t$) is at least any one of a normalized current location, vehicle speed, Euler angle, rotation angle, and yaw rate of an ego vehicle or a signal in which normalized signals are combined.

The signal buffer 210 is means for transmitting the input signals ($P_t$) at high speed, and is means for transmitting, to the near future object prediction neural network 300, an input signal history ($P_{t-\delta t \to t}$) from the current timing (t) to the given past timing (t−δt).

The remaining blocks illustrated in FIGS. 4 and 5 are specifically described later with reference to FIG. 6 and subsequent drawings thereto.

Figure 6:
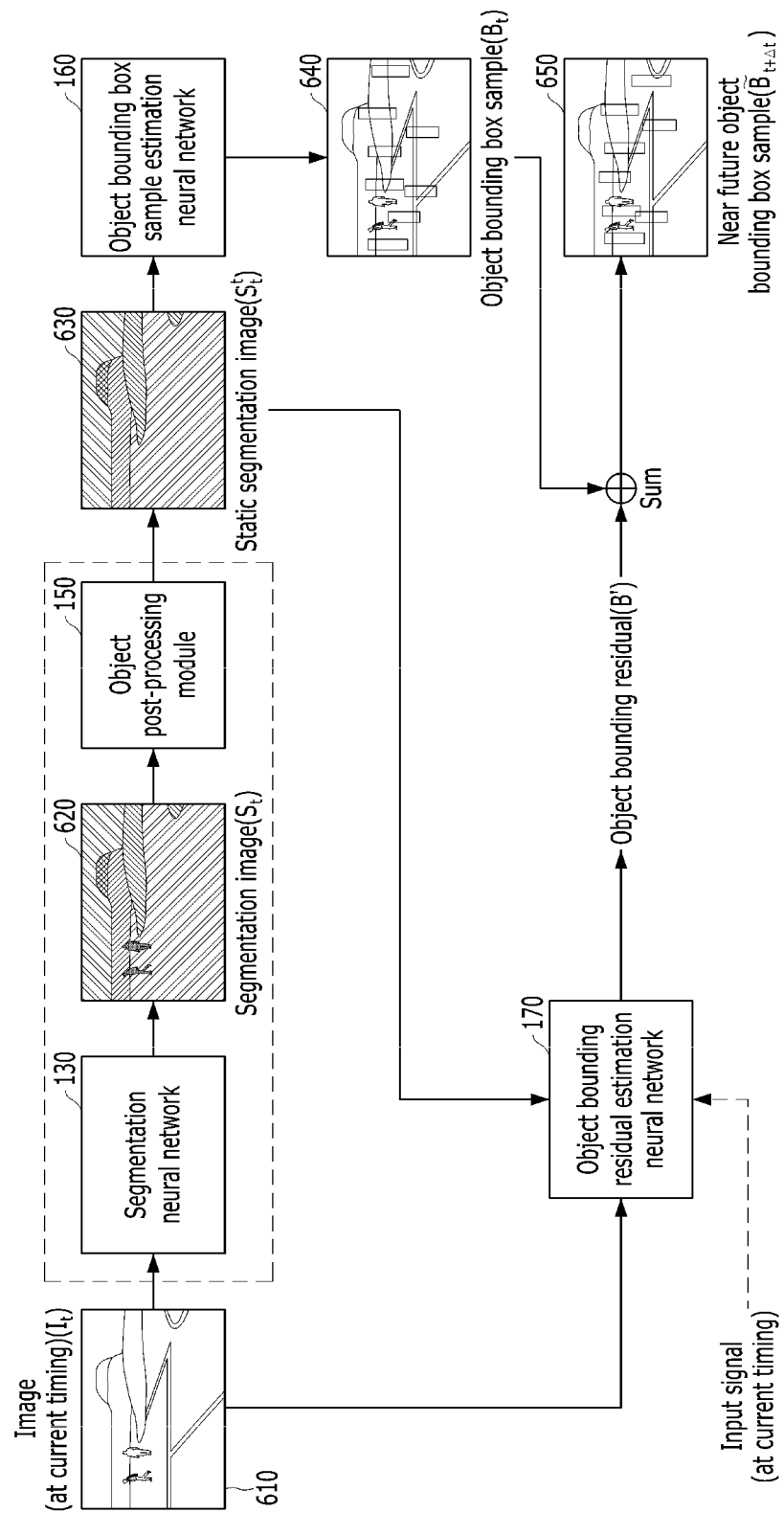
FIG. 6 is a block diagram specifically depicting a process of learning a near future object bounding box sample in the present disclosure.

FIG. 6 is a block diagram specifically depicting a process of learning a near future object bounding box sample in the present disclosure.

Referring to FIG. 6, the segmentation neural network 130 recognizes objects in a current timing image ($I_t$) 610 photographed in a vehicle, and outputs the current timing image ($I_t$) 610 as a segmentation image ($S_t$) 620 obtained by assigning attributes to the respective recognized objects. The object post-processing module 150 finds a dynamic object in the segmentation image 620, removes the dynamic object from the segmentation image 620, and converts the segmentation image 620 into a static segmentation image ($S_t^f$) 630. The segmentation neural network 130 and the object post-processing module 150 indicated by a dotted box in FIG. 6 correspond to a process of pre-processing an image by assigning semantic attributes to the current timing image 610 in the present disclosure.

Figure 8:
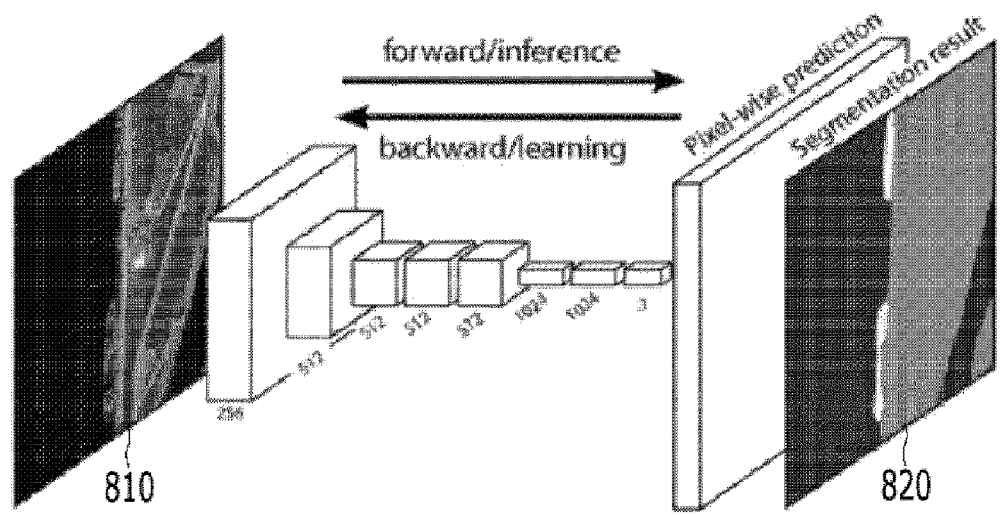
FIG. 8 is a block diagram illustrating a structure of a segmentation neural network in the present disclosure.

FIG. 8 is a block diagram illustrating a structure of a segmentation neural network in the present disclosure, and illustrates a structure of a semantic segmentation fully convolutional network (FCN). The semantic segmentation means a task for segmenting all objects within an image in a semantic unit, and is also referred to as dense prediction that predicts labels of all pixels within an image. The semantic segmentation FCN learns an input image 810 in a stepwise manner and outputs the input image 810 as a segmentation image 820 in which objects are segmented. The segmentation neural network 130 does not need to be configured as the semantic segmentation FCN, and may be configured as an instance segmentation neural network or a panoptic segmentation neural network.

Figure 9:
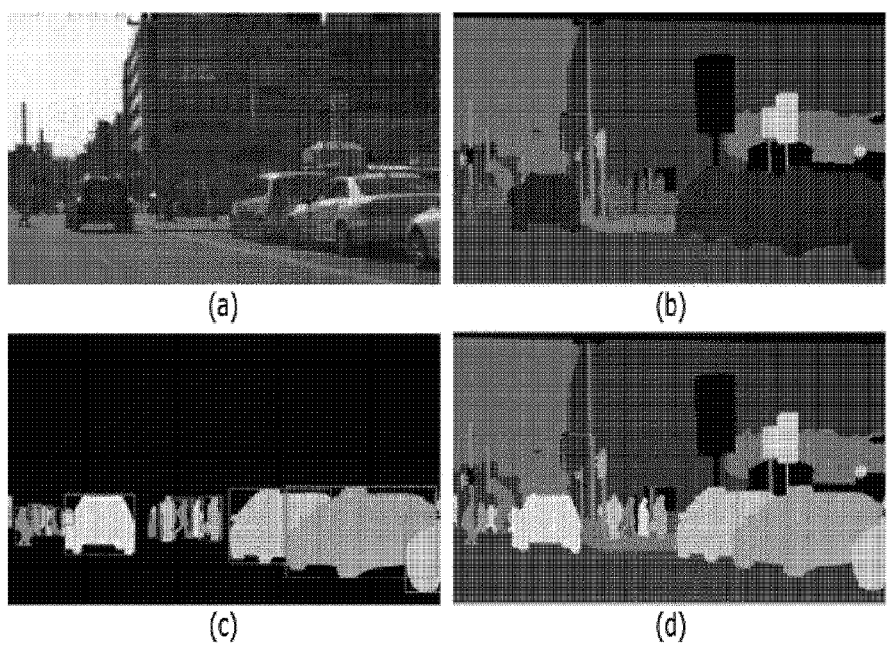
FIG. 9 is a diagram illustrating embodiments of segmentation images in the present disclosure.

FIG. 9 (a) illustrates an example of a current timing image ($I_t$). The segmentation neural network 130 may be configured as a semantic segmentation neural network, as illustrated in FIG. 8. In this case, the segmentation neural network 130 generates a segmentation image ($S_t$) by assigning different attributes to recognized objects depending on the types of the recognized objects in the current timing image ($I_t$). For example, a semantic segmentation image is generated as in FIG. 9 (b) by assigning attributes to a sky area, a road area, a building area, a sign area, a vehicle area, a person area, etc. for each type of object within an image.

For another example, the segmentation neural network 130 may be configured as an instance segmentation neural network. In this case, the segmentation neural network 130 generates the segmentation image ($S_t$) by assigning different attributes to respective dynamic objects among objects recognized in the current timing image ($I_t$) and assigning background attributes to all static objects among the recognized objects. For example, an instance segmentation image is generated as in FIG. 9 (c) by assigning different attributes to respective dynamic objects, such as a vehicle 1, a vehicle 2, a vehicle 3, a person 1, a person 2, and a person 3, and assigning the same attributes to all the remaining static objects.

Furthermore, for example, the segmentation neural network 130 may be configured as a panoptic segmentation neural network. In this case, the segmentation neural network 130 generates the segmentation image ($S_t$) by assigning different attributes to respective dynamic objects among objects recognized in the current timing image ($I_t$) and assigning different attributes to respective static objects among the recognized objects, depending on the type of object. The panoptic segmentation neural network segments a dynamic object as instance segmentation and a static object as semantic segmentation. As in FIG. 9 (d), dynamic objects, such as a vehicle 1, a vehicle 2, a vehicle 3, a person 1, a person 2, and a person 3, are independently segmented. Static objects, such as a sky area, a road area, a building area, and a sign area, are segmented so that the same classes have the same attributes.

When performing learning for recognizing and segmenting an object, the segmentation neural network 130 may calculate a loss by using a cross-entropy loss function and may update parameters of a learning model by using a stochastic gradient descent from learning results.

Meanwhile, referring to FIG. 4, the segmentation buffer 140 is means for transmitting, to the near future object prediction neural network 300 to be described later, the segmentation images ($S_t$), outputted by the segmentation neural network 130, at high speed, and is means for transmitting a segmentation image history ($S_{t-\delta t \to t}$) from current timing ($I_t$) to given past timing (t−δt).

Figure 10:
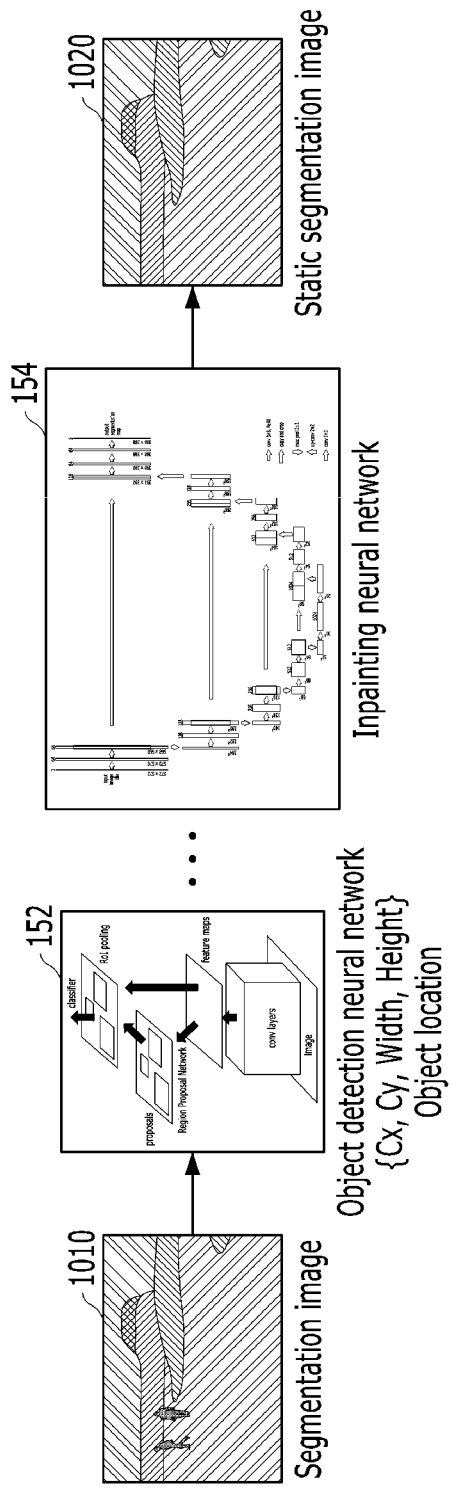
FIG. 10 is a block diagram specifically depicting an object post-processing module in the present disclosure.

FIG. 10 is a block diagram specifically depicting the object post-processing module in the present disclosure. A process of finding, by the object post-processing module 150, a dynamic object in a segmentation image ($S_t$) 1010, removing the dynamic object from the segmentation image ($S_t$) 1010, and converting the segmentation image ($S_t$) 1010 into a static segmentation image ($S_t^f$) 1020 is described in detail below with reference to FIG. 10.

Referring to FIG. 10, the object post-processing module 150 includes an object detection neural network 152 and an inpainting neural network 154. The object detection neural network 152 is a neural network for detecting a dynamic object from the segmentation image 1010, and may consist of CNNs, that is, a set of convolution layers and fully connected layers. Such a set of neural networks operates a region of interest (RoI) through h a region proposal network (RPN) without selective search, and detects a dynamic object by pooling the operated RoI. The inpainting neural network 154 removes pixels where a dynamic object is located in the segmentation image 1010, and fills the removed pixels with attributes of an adjacent static object. For example, the inpainting neural network 154 consists of a U-net, and performs learning by using a method of calculating a loss through a generative adversarial loss function by comparing the results of inpainting estimation and a ground true and of updating parameters of a learning model by using an Adam optimization algorithm. The inpainting neural network 154 receives information on center point coordinates, width, and height of a dynamic object from the object detection neural network 152, and estimates a bounding box including the dynamic object. Furthermore, the inpainting neural network 154 generates the static segmentation image 1020 by filling pixels within the estimated bounding box with pixels of an adjacent static object.

Referring back to FIG. 4, the bounding box of the dynamic object detected by the object post-processing module 150 is outputted as an image-based object bounding box ($B_t^i$) at the current timing (t) and delivered to the mask generation module 180 as an input. The mask generation module 180 generates a mask image ($M_t$) by mask-processing an area, except the dynamic object, in the image-based object bounding box ($B_t^i$). The mask buffer 190 is means for transmitting, at high speed, the mask images ($M_t$) to the near future object prediction neural network 300 to be described later, and generates a mask image history ($M_{t-\delta t \to t}$) from the current timing (t) to the given past timing (t−δt) and transmits the mask image history ($M_{t-\delta t \to t}$) to the near future object prediction neural network 300.

Referring back to FIG. 6, the object bounding box sample estimation neural network 160 receives the static segmentation image ($S_t^r$) 630 and estimates a location of the dynamic object within the static segmentation image ($S_t^r$) 630. The object bounding box sample estimation neural network 160 generates an object estimation bounding box at each of points where the dynamic object is predicted to be located, and outputs an object bounding box sample ($B_t$) 640 including at least one object estimation bounding box. In this case, as the object bounding box sample estimation neural network 160 estimates the location of the dynamic object in the static segmentation image 630, that is, in an image from which the dynamic object has been removed, the object estimation bounding box may be generated based on context of a background formed by the static objects, regardless of an actual location of the dynamic object in the current timing image 610.

The object bounding box sample estimation neural network 160 estimates an object estimation bounding box and calculates a loss rate by comparing the estimated object estimation bounding box with a ground true. Furthermore, the object bounding box sample estimation neural network 160 updates a model estimation parameter through a process of minimizing the calculated loss rate, and outputs an object bounding box sample 540. The object estimation bounding box means a box defined as information on center point coordinates, width, and height of a point at which the dynamic object is estimated to be located. The example of FIG. 6 illustrates an image in which a total of eight object estimation bounding boxes are sampled and included within the object bounding box sample 540. The object bounding box sample 540 in FIG. 6 is an example for helping understanding of the disclosure. The object bounding box sample will be practically outputted as a data string that represents information on the eight object estimation bounding boxes without a background image.

As an embodiment, the object bounding box sample estimation neural network 160 may predict an object estimation bounding box by assigning a weight to a bounding point of a static object within the static segmentation image 630. As another embodiment, the object bounding box sample estimation neural network 160 may predict an object estimation bounding box by assigning a weight to a point at which an angle change rate of a normal for a contour line of a static object is steep within the static segmentation image 630.

The object bounding residual estimation neural network 170 is means for calculating an object bounding residual (B') by incorporating, into each of object estimation bounding boxes within the object bounding box sample ($B_t$) 640, an actual location of the dynamic object included in the current timing image 610. That is, as in FIG. 6, a near future object bounding box sample ($\tilde{B}_{t+\Delta t}$) 650, that is, an object bounding box sample at near future timing, may be calculated from current timing by adding the object bounding box sample ($B_t$) and the object bounding residual (B') at the current timing (t) together.

The object bounding residual estimation neural network 170 receives the current timing image ($I_t$) 610 and the static segmentation image ($S_t^r$) 630, and receives the input signal ($P_t$) at the current timing from the signal pre-processing module 210. Furthermore, the object bounding residual estimation neural network 170 operates the object bounding residual (B') for correcting the object bounding box sample 640, generated by estimating a location of a dynamic object from an image in which the dynamic object is not present, so that a location of an object estimation bounding box is approximate to an actual location of the dynamic object. As illustrated, the near future object bounding box sample ($\tilde{B}_{t+\Delta t}$) 650 is operated by adding the object bounding residual (B') to the object bounding box sample 640.

In the embodiment of FIG. 6, it may be seen that the locations of some of the total of eight object estimation bounding boxes located within the object bounding box sample 540 are adjusted in the near future object bounding box sample 650 and the eight object estimation bounding boxes are outputted as eight near future object bounding boxes.

The object bounding residual estimation neural network 170 calculates a loss rate by comparing the near future object bounding box sample 650 and the object bounding box sample 540. Furthermore, the object bounding residual estimation neural network 170 operates the object bounding residual (B') by updating the model estimation parameter through a process of minimizing the calculated loss rate.

As an embodiment, the object bounding residual estimation neural network 170 may operate the object bounding residual (B') by assigning a weight to the location of the dynamic object recognized in the current timing image 610 and a location where bounding points of static objects overlap within the static segmentation image 630. As another embodiment, the object bounding residual estimation neural network 170 may connect a feature map of the current timing image 610 and a feature map of the static segmentation image 630, and may operate the object bounding residual by correcting a feature map connection point by using the input signal ($P_t$).

A current timing image of a navigation terminal is overlaid with the near future object bounding box sample 550 obtained as the learning results of the neural network in FIG. 6 and the current timing image overlaid with the near future object bounding box sample 550 is outputted, so that a driver can easily recognize the near future appearance and location change of a dynamic object. Moreover, various accidents which may occur in the near future upon autonomous driving may be predicted by using, as an input to another neural network, the near future object bounding box sample 550 obtained as the learning results of the neural network in FIG. 6. In this case, the system for predicting a near future location of an object according to the present disclosure may more clearly distinguish and learn a future location of an object that has not appeared at the current timing (t), and a future location of an object that has already appeared at the current timing (t), by using the near future object prediction neural network 300 of FIG. 5, and may derive the results of the learning.

Figure 7:
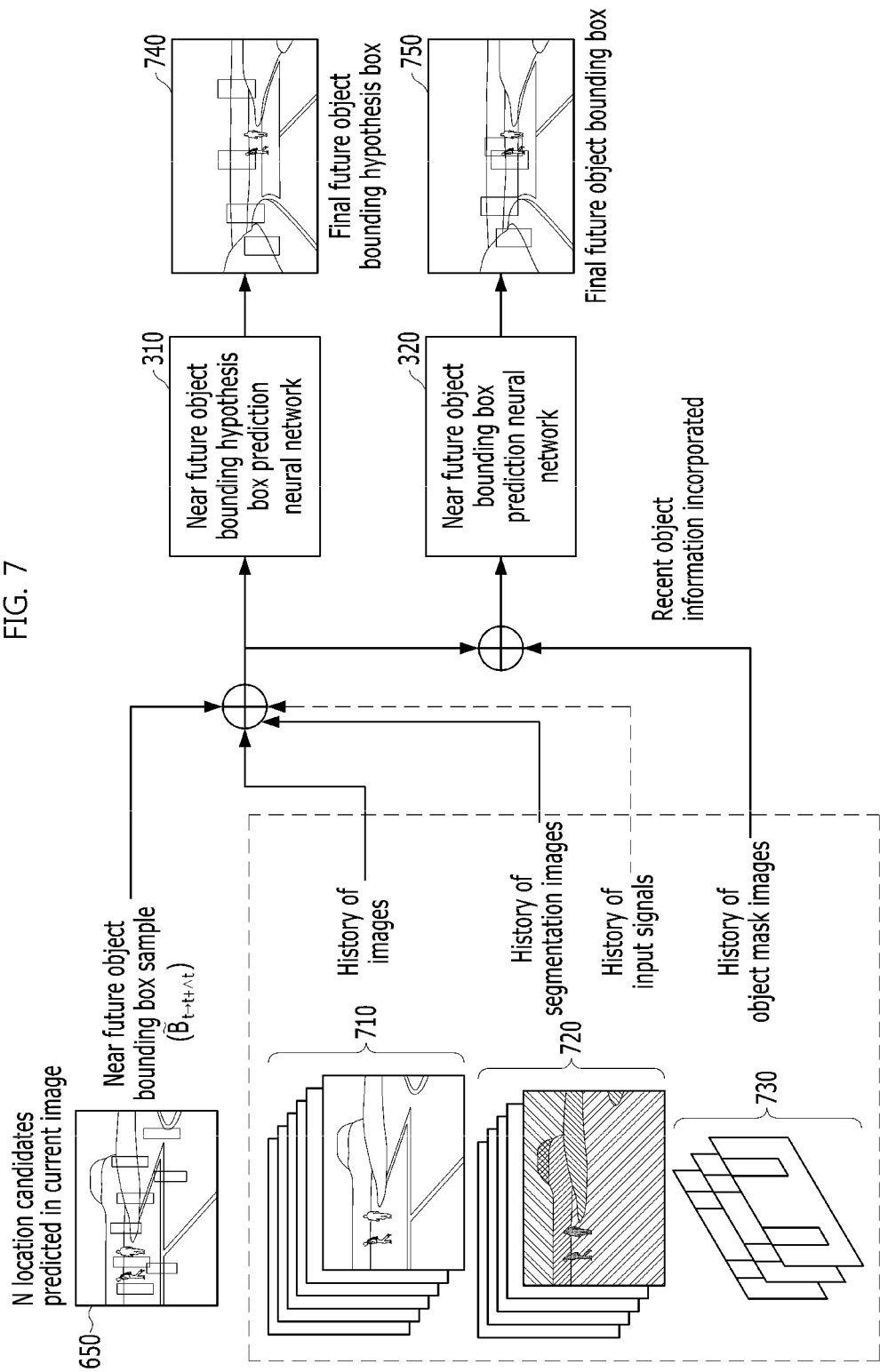
FIG. 7 is a block diagram specifically depicting a process of predicting future locations of an object that has not appeared and an object that has appeared, through the near future object prediction neural network of FIG. 5.

FIG. 7 is a block diagram specifically depicting a process of predicting future locations of an object that has not appeared and an object that has appeared, through the near future object prediction neural network of FIG. 4. In the present disclosure, the learning of a neural network for predicting a near future object bounding hypothesis box and a near future object bounding box is described in detail below with reference to FIG. 7.

Referring to FIG. 7, the near future object prediction neural network 300 includes the near future object bounding hypothesis box prediction neural network 310 and the near future object bounding box prediction neural network 320.

Both the near future object bounding hypothesis box prediction neural network 310 and the near future object bounding box prediction neural network 320 receive the near future object bounding box sample 650, that is, the learning results of the neural network in FIG. 6, as one input. As described above, the near future object bounding box sample 650 means N near future object bounding boxes that represent N location candidates at which the dynamic object is predicted to be located in the current timing image 610.

A history of images ($I_{t-\delta t \to t}$) 710 outputted by the image buffer 120, a history of segmentation images ($S_{t-\delta t \to t}$) 720 outputted by the segmentation buffer 140, and a history of input signals ($P_{t-\delta t \to t}$) outputted by the signal buffer 220 are used as other inputs to the near future object bounding hypothesis box prediction neural network 310. All the history of images ($I_{t-\delta t \to t}$) 710, the history of segmentation images ($S_{t-\delta t \to t}$) 720, the history of input signals ($P_{t-\delta t \to t}$) are data for correcting a near future object bounding box within the near future object bounding box sample 650 by incorporating data during a given time up to the past on the basis of current timing. The near future object bounding hypothesis box prediction neural network 310 generates Gaussian mixture models (GMMs) based on the near future object bounding box sample 650, determines a standard deviation as a width and height by using an average of the GMMs as center point coordinates, and generates a final future object bounding hypothesis box.

Referring to FIG. 7, four final future object bounding hypothesis boxes are depicted within a final future object bounding hypothesis box indication image ($\hat{B}_{t+\Delta t}$) 740. Compared to the near future object bounding box sample 650, four near future object bounding boxes have been removed, and the locations of the remaining four near future object bounding boxes have been changed or the remaining four near future object bounding boxes have been resized. The final future object bounding hypothesis box may have the same location and size as the near future object bounding box. The final future object bounding hypothesis box recommends a future location of a dynamic object that has not appeared at current timing based on context of a background.

The near future object bounding hypothesis box prediction neural network 310 may overlay the current timing image 610, outputted through a navigation terminal for a vehicle, with the four final future object bounding hypothesis boxes finally derived in FIG. 7, and display the current timing image 610 overlaid with the four final future object bounding hypothesis boxes. Furthermore, the near future object bounding hypothesis box prediction neural network 310 may display the type of object by adding annotations to the final future object bounding hypothesis box or changing a color of the final future object bounding hypothesis box. Accordingly, a driver can check the final future object bounding hypothesis box displayed in an overlaid manner, and can pre-recognize a dynamic object that will appear in the near future.

The near future object bounding hypothesis box neural network 320 receives the same history data (the history of images ($I_{t-\delta t \to t}$) 710, the history of segmentation images ($S_{t-\delta t \to t}$) 720, the history of input signals ($P_{t-\delta t \to t}$) as the near future object bounding hypothesis box prediction neural network 310, and further receives an object mask image history ($M_{t-\delta t \to t}$) outputted by the mask buffer 190. The object mask image history ($M_{t-\delta t \to t}$) is data for correcting a candidate location of a dynamic object that has appeared, by using information on locations of objects during a given time up to the past on the basis of current timing. The near future object bounding box prediction neural network 320 generates Gaussian mixture models (GMMs) based on the near future object bounding box sample 650, determines a standard deviation as a width and the height by using an average of the GMMs as center point coordinates, and generates a final future object bounding box.

Referring to FIG. 7, four final future object bounding boxes are depicted within a final future object bounding box indication image ($\hat{B}_{t+\Delta t}$) 750. Compared to the near future object bounding box sample 650, four near future object bounding boxes have been removed, and the locations of the remaining four near future object bounding boxes have been changed or the remaining four near future object bounding boxes have been resized. The final future object bounding box may also have the same location and size as the near future object bounding box. The final future object bounding box recommends a future location of a dynamic object that has already appeared in the current timing image.

The near future object bounding box prediction neural network 320 may overlay the current timing image 610, outputted through a navigation terminal for a vehicle, with the four final future object bounding boxes finally derived in FIG. 7, and display the current timing image 610 overlaid with the four final future object bounding boxes. Furthermore, the near future object bounding box prediction neural network 320 may display the type of object by adding annotations to the final future object bounding box or changing a color of the final future object bounding box. Accordingly, a driver can check the final future object bounding box displayed in an overlaid manner, and can pre-recognize a sudden change in the location of an object currently displayed on a screen.

Figure 11:
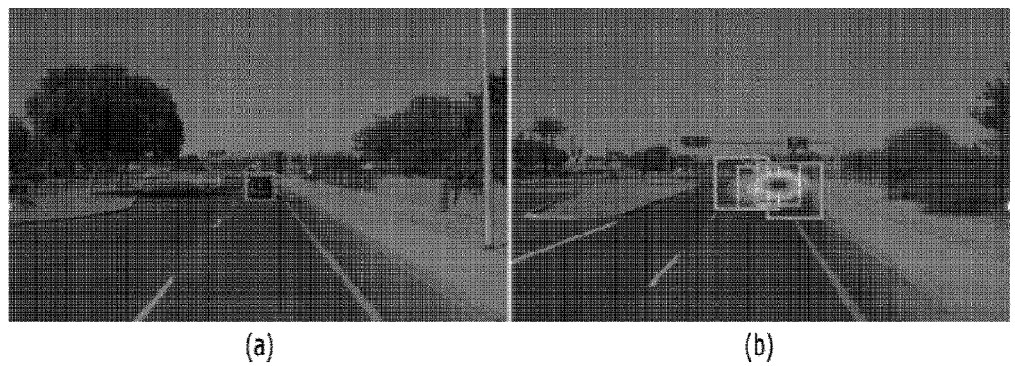
FIGS. 11 to 15 are diagrams illustrating examples in which prediction results of a near future location of an object are displayed on a navigation terminal according to the present disclosure.
Figure 12:
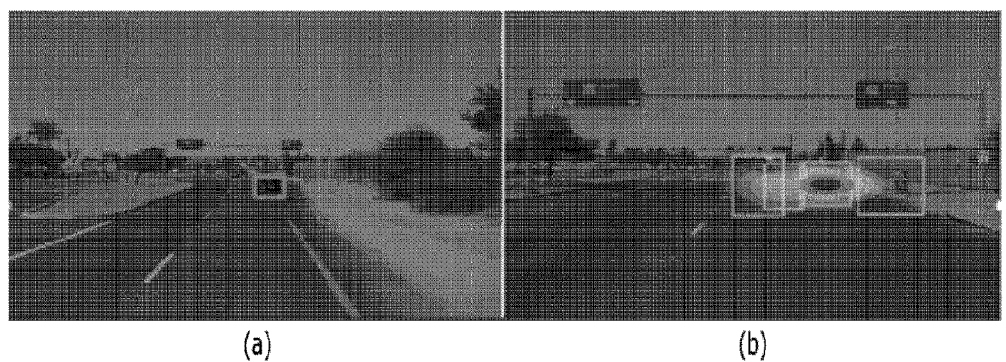
Figure 13:
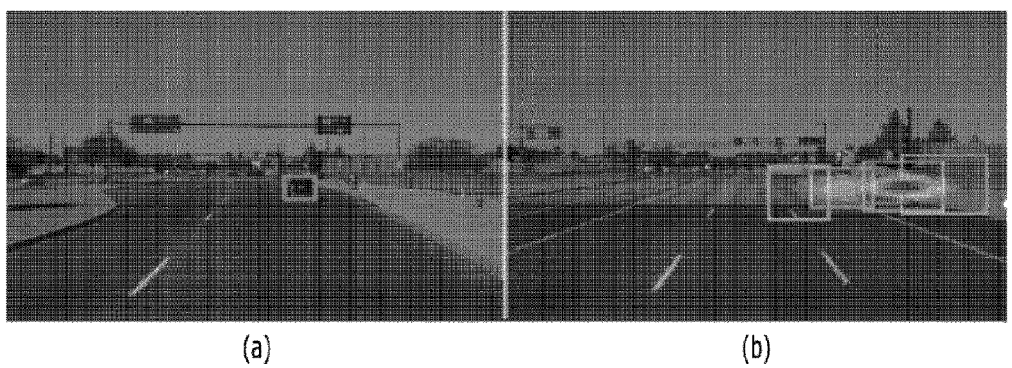
Figure 14:
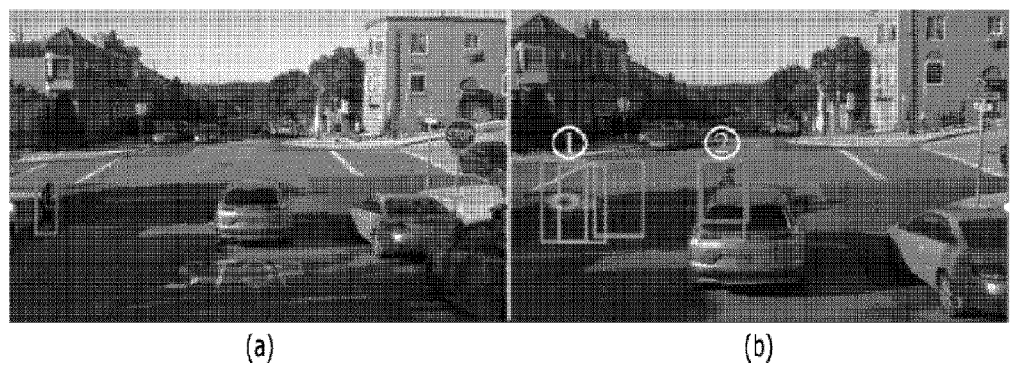
Figure 15:

FIGS. 11 to 15 are diagrams illustrating examples in which prediction results of a near future location of an object are displayed on a navigation terminal according to the present disclosure. FIGS. 11 to 13 illustrate screens in which a near future location of a vehicle ahead is predicted. In FIGS. 14 and 15, a near future location of a front pedestrian is predicted.

FIG. 11 (a) illustrates a current timing image ($I_t$) in front of a vehicle. A vehicle ahead travels within a lane. FIG. 11 (b) illustrates a screen in which the near future object bounding box prediction neural network 320 generates a plurality of final future object bounding boxes around the vehicle ahead, overlays the current timing image ($I_t$) with the final future object bounding boxes, and displays the current timing image ($I_t$) overlaid with the final future object bounding boxes. A near future location of the vehicle ahead is intensively displayed in proximity to the left and the right of the vehicle ahead.

FIG. 12 (a) illustrates a current timing image (a current timing image at timing of FIG. 12) after a lapse of a given time in FIG. 11 (a). It may be seen that the vehicle ahead has been in the right lane. Conventionally, a learning system using a method of tracking an object predicts that a vehicle ahead will change the driving lane to the right lane. However, in the present disclosure, referring to FIG. 12 (b), a final future object bounding box, indicating an unexpected situation in which the vehicle ahead returns to its original driving lane or greatly changes its direction to the left, is displayed along with a final future object bounding box in which the vehicle ahead is predicted to travel to the right.

FIG. 13 (a) illustrates an image after a further lapse of the time in FIG. 12 (a), and illustrates the state in which the vehicle ahead has changed its course to the right lane. The system for predicting a near future location of an object according to the present disclosure displays a final future object bounding box indicating the probability that the vehicle ahead will return to its original driving lane and a final future object bounding box in which the vehicle ahead has stopped at a current location, along with a final future object bounding box in which the vehicle ahead is predicted to travel along the shoulder of a road.

FIG. 14 (a) illustrates the state in which a pedestrian on the left stands at the end of a crosswalk. As in FIG. 14 (b), the near future object bounding box prediction neural network 320 dominantly predicts a situation in which the pedestrian stays in the vicinity of the end of the crosswalk in the near future in the state in which the vehicle ahead is present, but may also predict a situation in which the pedestrian crosses the crosswalk at a brisk pace and moves up to the front of the vehicle ahead (as in a final future object bounding box displayed in the middle of a screen in FIG. 14 (b)). If a near future location of an object illustrated in FIG. 14 (b) is predicted, control for suddenly decelerating the speed of an ego vehicle by predicting a sudden stop of a vehicle ahead may be performed.

FIG. 15 (a) illustrates a current timing image in which the time in FIG. 14 elapses and the pedestrian is thus located right ahead of the vehicle ahead. As in FIG. 15 (b), a near future situation in which the pedestrian completely crosses the crosswalk or a near future situation in which the pedestrian changes his or her direction at the crosswalk by avoiding the vehicle ahead and walks in a diagonal direction may be predicted and displayed.

The disclosed disclosure may be modified in various ways within a range that does not impair a basic spirit of the present disclosure. That is, all the embodiments should be interpreted as being illustrative and are not interpreted as being limitative. Accordingly, the scope of protection of the present disclosure should be determined by the accompanying claims, not the above embodiments. If limited element in the accompanying claims is substituted with an equivalent thereto, the substitution should be construed as belonging to the scope of the protection of the present disclosure.

The invention claimed is:

1. A system for predicting a near future location of an object, comprising:
a segmentation neural network configured to recognize objects in a current timing image photographed by a vehicle and output the current timing image as a segmentation image obtained by assigning attributes to the respective recognized objects;
an object post-processing module configured to convert the segmentation image into a static segmentation image by finding a dynamic object in the segmentation image and removing the dynamic object;
an object bounding box sample estimation neural network configured to receive the static segmentation image, estimate a location of the dynamic object within the static segmentation image, generate an object estimation bounding box at each point at which the dynamic object is estimated to be located, generate an object bounding box sample comprising at least one object estimation bounding box, and output the object bounding box sample; and
an object bounding residual estimation neural network configured to receive the current timing image and the static segmentation image, receive, from the vehicle, a sensing signal in a time identical with a time of the current timing image as an input signal, predict a bounding box in which the dynamic object recognized in the current timing image is expected to be located in the near future, operate an object bounding residual which is a difference between the predicted bounding box and the object estimation bounding box, and output a near future object bounding box sample comprising at least one near future object bounding box indicative of a near future location of the dynamic object by adding the object bounding residual to the object bounding box sample.

2. The system of claim 1, further comprising an image pre-processing module configured to generate the current timing image by pre-processing the image photographed by the vehicle.

3. The system of claim 2, wherein the image pre-processing module normalizes the current timing image by performing at least one of an image resize and an image crop on the image photographed by the vehicle.

4. The system of claim 1, further comprising a signal pre-processing module configured to receive sensing signals from a plurality of sensors installed on the vehicle, normalize the sensing signals, and provide the object bounding residual estimation neural network with the signals as the input signal.

5. The system of claim 4, wherein the signal pre-processing module normalizes, as an ego-motion signal related to a movement of an ego vehicle, a combination of one or more of an on-board diagnostics (OBD) signal, an inertial measurement unit (IMU) signal, and a global positioning system (GPS) signal received from the sensors.

6. The system of claim 5, wherein the input signal is at least one of a current location, a vehicle speed, an Euler angle, a rotation angle, and a yaw rate of the ego vehicle.

7. The system of claim 1, wherein the segmentation neural network generates the segmentation image by assigning different attributes to the recognized objects depending on the type of object recognized in the current timing image.

8. The system of claim 1, wherein the segmentation neural network generates the segmentation image by assigning different attributes to respective dynamic objects among the objects recognized in the current timing image and assigning background attributes to all static objects among the objects recognized in the current timing image.

9. The system of claim 1, wherein the segmentation neural network generates the segmentation image by assigning different attributes to respective dynamic objects among the objects recognized in the current timing image and assigning different attributes to respective static objects among the objects recognized in the current timing image depending on the type of object.

10. The system of claim 1, wherein when performing learning for recognizing and segmenting the object, the segmentation neural network
calculates a loss by using a cross-entropy loss function, and
updates parameters of a learning model by using a stochastic gradient descent based on results of the learning.

11. The system of claim 1, wherein the object post-processing module comprises:
an object detection neural network configured to detect a dynamic object in the segmentation image; and
an inpainting neural network configured to remove pixels where the dynamic object is located in the segmentation image and fill the removed pixels with attributes of an adjacent static object.

12. The system of claim 11, wherein the inpainting neural network
receives information on center point coordinates, width, and height of the dynamic object from the object detection neural network,
estimates a bounding box comprising the dynamic object, and
generates the static segmentation image by filling pixels within the corresponding bounding box with pixels of an adjacent static object.

13. The system of claim 1, wherein the object bounding box sample estimation neural network
estimates the object estimation bounding box,
calculates a loss rate by comparing the estimated object estimation bounding box with a ground true, and
outputs the object bounding box sample by updating a model estimation parameter through a process of minimizing the calculated loss rate.

14. The system of claim 13, wherein the object bounding box sample estimation neural network predicts the object estimation bounding box by assigning a weight to a bounding point of a static object within the static segmentation image.

15. The system of claim 13, wherein the object bounding box sample estimation neural network predicts the object estimation bounding box by assigning a weight to a point at which an angle change rate of a normal for a contour line of a static object is steep within the static segmentation image.

16. The system of claim 1, wherein the object bounding residual estimation neural network
calculates a loss rate by comparing the near future object bounding box sample and the object bounding box sample, and
operates the object bounding residual by updating a model estimation parameter through a process of minimizing the calculated loss rate.

17. The system of claim 16, wherein the object bounding residual estimation neural network operates the object bounding residual by assigning a weight to a location of a dynamic object recognized in the current timing image and a location where bounding points of static objects overlap within the static segmentation image.

18. The system of claim 16, wherein the object bounding residual estimation neural network operates the object bounding residual by connecting a feature map of the current timing image and a feature map of the static segmentation image and correcting a feature map connection point by using the input signal.

19. The system of claim 1, further comprising a near future object bounding hypothesis box prediction neural network configured to receive, as one input, the near future object bounding box sample for the current timing image, predict a type and future location of an object not appearing in the current timing image, and output the near future object bounding box sample as a final future object bounding hypothesis box.

20. The system of claim 19, wherein the near future object bounding hypothesis box prediction neural network
receives a history of images from the current timing to a given past, a history of segmentation images outputted by the segmentation neural network from the current timing to a given past, and a history of input signals corresponding to each image included in the history of the images,
generates Gaussian mixture models (GMMs) based on the near future object bounding box sample,
determines a standard deviation as a width and height by using an average of the GMMs as center point coordinates, and
generates the final future object bounding hypothesis box.

21. The system of claim 20, wherein the near future object bounding hypothesis box prediction neural network overlays the current timing image, outputted through a navigation terminal for a vehicle, with the final future object bounding hypothesis box, and displays the current timing image overlaid with the final future object bounding hypothesis box.

22. The system of claim 21, wherein the near future object bounding hypothesis box prediction neural network displays the type of object by adding annotations to the final future object bounding hypothesis box or changing a color of the final future object bounding hypothesis box.

23. The system of claim 1, further comprising a near future object bounding box prediction neural network configured to receive, as one input, the near future object bounding box sample for the current timing image, predict a type and future location of an object appearing in the current timing image, and output the near future object bounding box sample as the final future object bounding box.

24. The system of claim 23, wherein the near future object bounding box prediction neural network
receives a history of images from the current timing to a given past, a history of segmentation images outputted by the segmentation neural network from the current timing to a given past, a history of input signals corresponding to each image included in the history of the images, and a history of object mask images obtained by mask-processing an area, except a dynamic object, and outputted by a mask generation module at a rear end of the object post-processing module,
generates Gaussian mixture models (GMMs) based on the near future object bounding box sample,
determines a standard deviation as a width and height by using an average of the GMMs as center point coordinates, and
generates the final future object bounding box.

25. The system of claim 24, wherein the near future object bounding box prediction neural network overlays the current timing image, outputted through a navigation terminal for a vehicle, with the final future object bounding box, and displays the current timing image overlaid with the final future object bounding box.

26. The system of claim 25, wherein the near future object bounding box prediction neural network displays the type of object by adding annotations to the final future object bounding box or changing a color of the final future object bounding box.

* * * * *